(12) United States Patent
Kurokawa et al.

(10) Patent No.: US 10,209,699 B2
(45) Date of Patent: Feb. 19, 2019

(54) MACHINE CONTROL PANEL

(71) Applicant: FANUC Corporation, Yamanashi (JP)

(72) Inventors: Yuuki Kurokawa, Yamanashi (JP); Yasushi Nomoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 389 days.

(21) Appl. No.: 14/156,003

(22) Filed: Jan. 15, 2014

(65) Prior Publication Data
US 2014/0207259 A1 Jul. 24, 2014

(30) Foreign Application Priority Data

Jan. 18, 2013 (JP) .................................. 2013-007715

(51) Int. Cl.
G05B 9/03 (2006.01)
G05B 19/406 (2006.01)
G05B 19/409 (2006.01)

(52) U.S. Cl.
CPC ............. G05B 19/406 (2013.01); G05B 9/03 (2013.01); G05B 19/409 (2013.01); G05B 2219/24184 (2013.01); G05B 2219/25163 (2013.01)

(58) Field of Classification Search
None
See application file for complete search history.

(56) References Cited

U.S. PATENT DOCUMENTS

| 4,881,220 A | * | 11/1989 | Yomogida ............. H04L 12/437 370/222 |
|---|---|---|---|
| 6,073,191 A | | 6/2000 | Aizawa |
| 6,526,324 B1 | | 2/2003 | Kinoshita et al. |
| 2002/0024335 A1 | * | 2/2002 | Kiriyama ............. G01D 5/2086 324/207.17 |

FOREIGN PATENT DOCUMENTS

| CN | 102135765 A | 7/2011 |
|---|---|---|
| JP | 793592 B2 | 10/1995 |
| JP | 9106306 A | 4/1997 |
| JP | 11-161326 A | 6/1999 |
| JP | 4242697 B2 | 3/2009 |

OTHER PUBLICATIONS

Office Action dated Jul. 15, 2014, corresponding to Japanese patent application No. 2013-007715.

(Continued)

Primary Examiner — Mohammad Ali
Assistant Examiner — Saad M Kabir
(74) Attorney, Agent, or Firm — Hauptman Ham, LLP

(57) ABSTRACT

A key switch on a machine control panel is provided with two contacts such that the machine control panel can include two independent communication circuits. Signals from a double-contact key switch are received by the two communication circuits, and safety-related signals are transmitted from the communication circuits to a numerical controller through a bus. The signals received by the numerical controller are compared with each other so that they can be made to comply with the safety standards by monitoring the integrity of the safety function.

2 Claims, 5 Drawing Sheets

(56) References Cited

OTHER PUBLICATIONS

British Standard "Machine tools—Safety—Machining centres" The European Standard EN 12417:2001, incorporating amendment No. 1 (Aug. 2001).
"Ursprunglich veroffentlicht in deutscher Sprache von Huthig GmbH &Co KG, Heidelberg, Bundesrepublik Deutshland unter dem Titel Reinert, Schafer(Hrsg,):Sichere Bussysteme fur die Automation. Copyright 2001" (Japanese Version).
Office Action dated May 15, 2015, corresponding to Chinese patent application No. 201410025834.8.

\* cited by examiner

MACHINE CONTROL PANEL

RELATED APPLICATIONS

The present application claims priority to Japanese Application Number 2013-007715, filed Jan. 18, 2013, the disclosure of which is hereby incorporated by reference herein in its entirety.

BACKGROUND OF THE INVENTION

Field of the Invention

The present invention relates to a machine control panel, and more particularly, to a machine control panel compliant with the safety standards.

Description of the Related Art

An example of a conventional machine control panel will be described with reference to FIG. 3.

As shown in FIG. 3, a machine control panel 12 is connected to a numerical controller 10 by a bus 18. Since the machine control panel 12 comprises only a plurality of single-contact key switches 14 and one communication circuit 16, it is difficult to categorize signals of the key switches 14 into two systems. In order to make the machine control panel 12 comply with the safety standards, signals related to the hold-to-run control of jog buttons, among other switches on the machine control panel 12, should first be categorized into two systems.

Accordingly, as shown in FIG. 4, the single-contact key switches on the machine control panel are replaced with a double-contact switch (hold-to-run) 28 such that key switch signals can be categorized into two systems by inputting signals from the switch 28 to communication circuits 22 and 26 of independent I/O units 20 and 24. Further, safety-related signals are transmitted from the communication circuits 22 and 26 of the I/O units 20 and 24 to the numerical controller 10 through buses 30. The signals received by the numerical controller 10 are compared so that they can be made to comply with the safety standards by monitoring the integrity of the safety function.

As shown in FIG. 5, moreover, a double-contact enable switch 32 may be provided, and signals from the double-contact enable switch 32 are input to the communication circuits 22 and 26 of the independent I/O units 20 and 24 so that these signals may be categorized into two systems. Further, by using the double-system enable switch 32 in combination with the key switches 14 of the machine control panel 12, it is possible to make these switches 32, 14 comply with safety standards. For example, the enable switch 32 may be configured so that signals of the key switches 14 on the machine control panel 12 are enabled only when the enable switch 32 is depressed.

The safety-related signals include input signals for external emergency stop and the like and output signals for power interruption and the like, as well as the input signals related to the hold-to-run control. The input signals for emergency stop and the like can be made to comply with the safety standards in the same method as in FIG. 4. To make the output signals for power interruption and the like comply with the safety standards, as shown in FIG. 6, it is necessary to transmit the safety-related signals from the numerical controller 10 to the communication circuits 22 and 26 of the independent I/O units 20 and 24 and output signals of two systems from the communication circuits 22 and 26 to power interruption means 34.

Japanese Patent Application Laid-Open No. 11-16132 discloses a technique for comparing and monitoring signals in a numerical controller. Buses capable of transmitting safety-related signals are described in "Ursprünglich veröffentlicht in deutscher Sprache von Hüthig GmbH & Co KG, Heidelberg, Bundesrepublik Deutshland unter dem Titel Reinert, Schafer (Hrsg,): Sichere Bussysteme fur die Automation. Copyright 2001". Further, a method of complying with the safety standards using an enable switch is disclosed in "Safety Standards EN12417".

There is a problem that I/O units and switches for a dual-system configuration must be separately provided to make a noncompliant machine comply with the safety standards. There is also a problem that the operability of a machine control panel inevitably varies if an enable switch and key switches are used in combination.

SUMMARY OF THE INVENTION

Accordingly, in view of the problems of the prior art described above, the object of the present invention is to provide a machine control panel, in which I/O units or switches need not be additionally provided to make a noncompliant machine comply with the safety standards and the operability of which is not variable.

A machine control panel for operating a machine tool according to the present invention is connected to a numerical controller for controlling the machine tool and comprises a key switch provided on the machine control panel, first and second contacts configured to be turned on when the key switch is depressed, a first communication circuit connected to the first contact and configured to receive a signal of the key switch, a second communication circuit connected to the second contact and configured to receive a signal of the key switch, a transmission line connecting the first and second communication circuits and configured to transmit the signal of the second communication circuit to the first communication circuit, and a transmission line configured to transmit the signals of the first and second communication circuits from the first communication circuit to the numerical controller.

The machine control panel may further comprise a first input circuit and a second input circuit capable of receiving external signals of two systems, and the first and second input circuits may be connected to the first and second communication circuits, respectively.

The machine control panel may further comprise a first output circuit connected to the first communication circuit and a second output circuit connected to the second communication circuit, and signals received from the numerical controller may be externally output from the first and second output circuits through the first and second communication circuits, respectively.

According to the present invention, there can be provided a machine control panel, in which I/O units or switches need not be additionally provided to make a noncompliant machine comply with the safety standards and the operability of which is not variable.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A first embodiment of a machine control panel according to the present invention will first be described with reference to FIG. 1.

Figure 1:
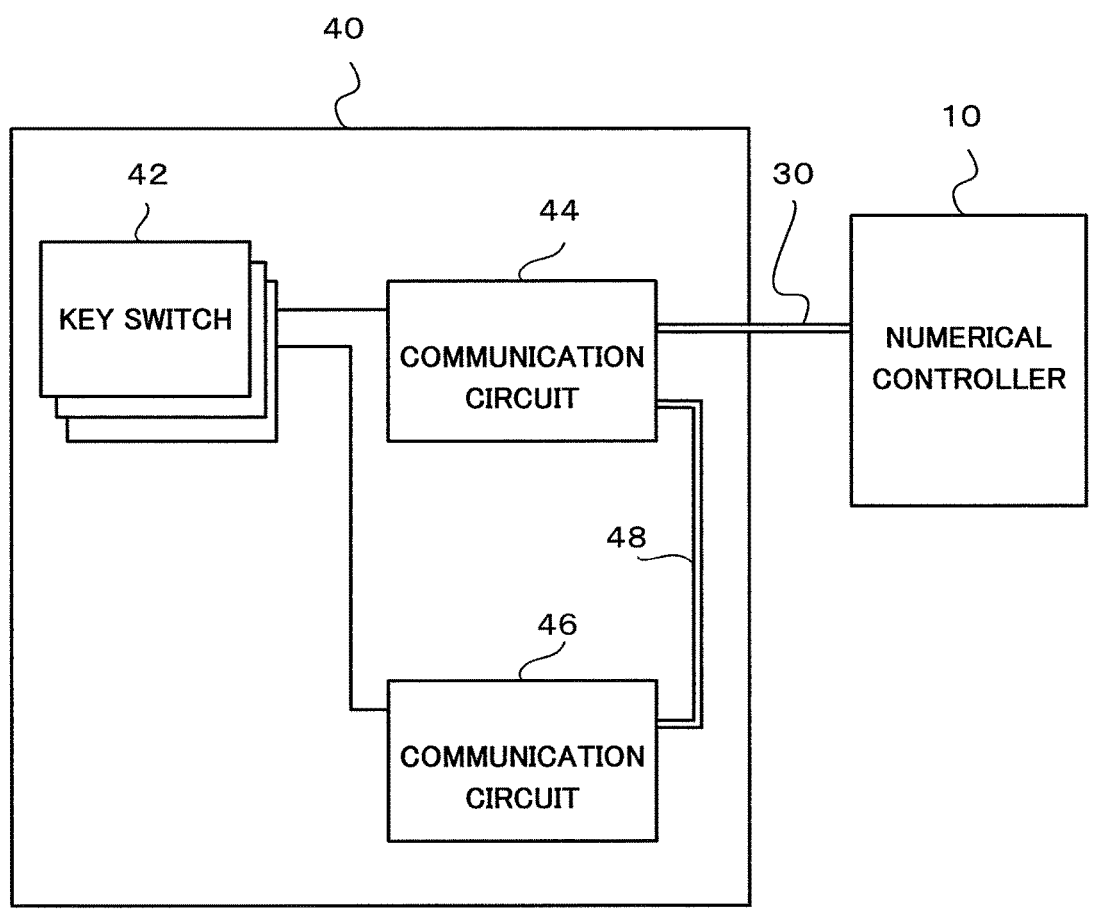
FIG. 1 is a diagram illustrating a first embodiment of a machine control panel according to the present invention.

As shown in FIG. 1, a machine control panel 40 is connected to a numerical controller 10 for controlling a machine tool. One or more key switches 42 are provided on the machine control panel 40. Each key switch 42 comprises first and second contacts that are turned on when depressed.

The machine control panel 40 further comprises a first communication circuit (communication circuit 44), second communication circuit (communication circuit 46), transmission line (first bus 48 capable of transmitting safety-related signals), and transmission line (second bus 30 capable of transmitting safety-related signals). The communication circuit 44 is connected to the first contact and receives signals of the depressed key switches 42. The communication circuit 46 is connected to the second contact and receives signals of the depressed key switches 42. The first bus 48 connects the communication circuits 44 and 46 and serves to transmit signals of the communication circuit 46 to the communication circuit 44. The second bus 30 serves to transmit the signals of the communication circuits 44 and 46 from the communication circuit 44 to the numerical controller 10 for controlling the machine tool.

The first bus 48, which can transmit safety-related signals, is constructed as wiring of a printed circuit board in the machine control panel 40. On the other hand, the second bus 30, which can also transmit safety-related signals, connects the machine control panel 40 and the numerical controller 10 by means of a cable. Further, the first and second communication circuits 44 and 46 may be constructed as a package.

Figure 4:
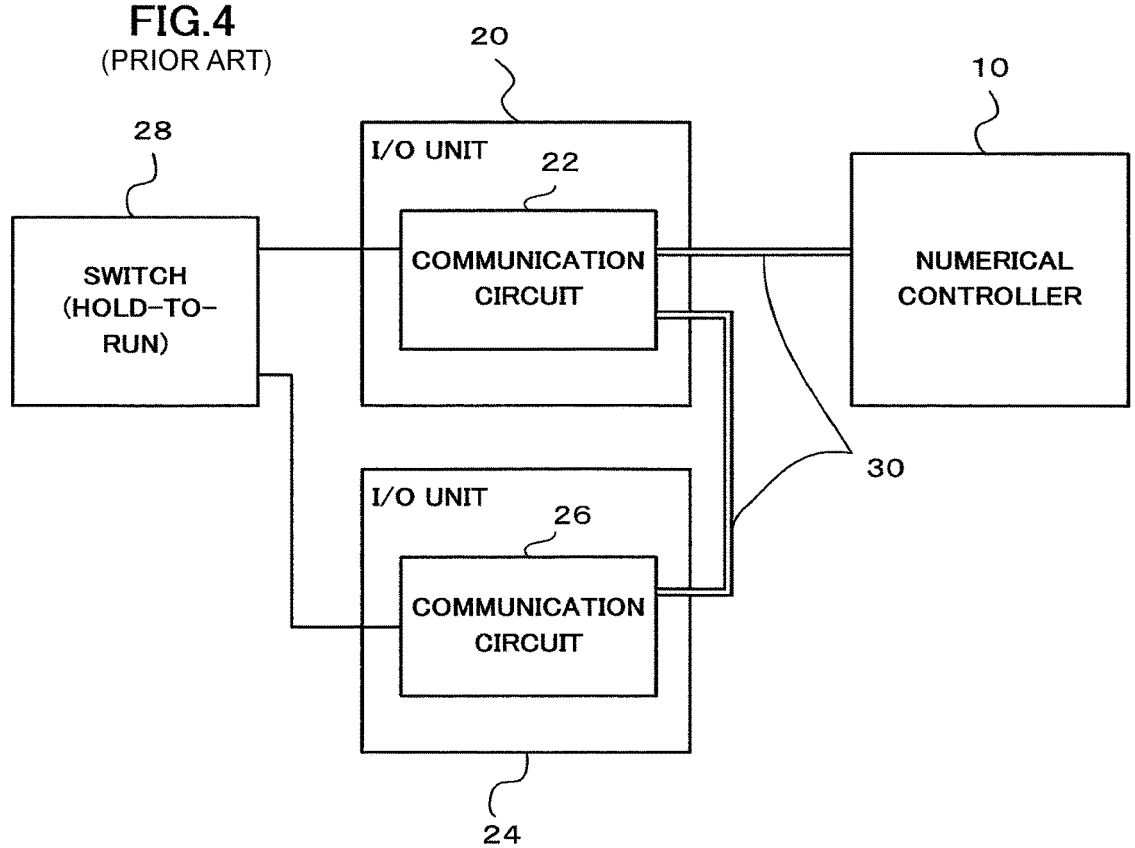
FIG. 4 is a diagram illustrating an example of a conventional machine control panel using a double-contact switch.
Figure 5:
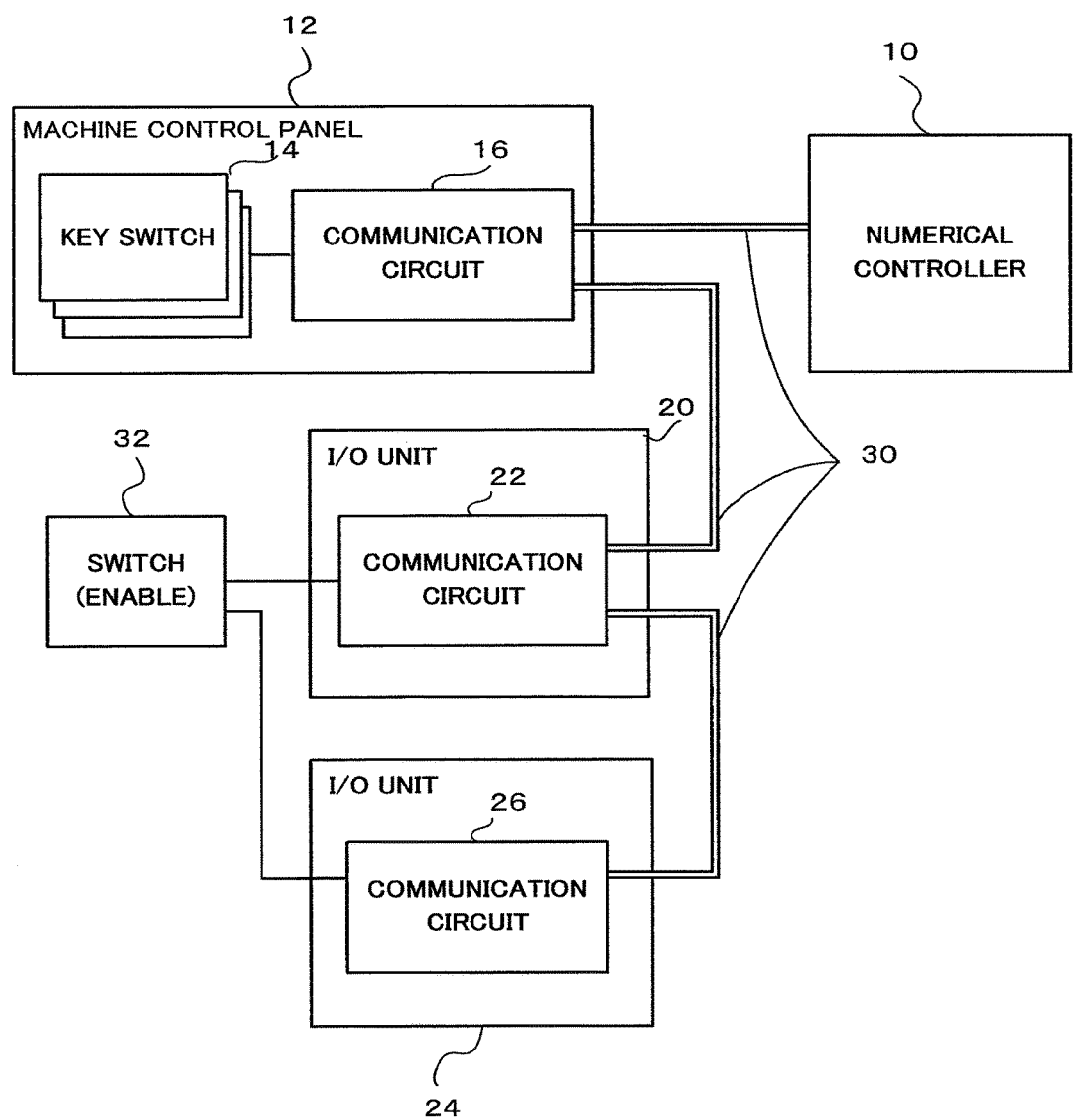
FIG. 5 is a diagram illustrating an example of a conventional machine control panel using a double-contact enable switch.
Figure 6:
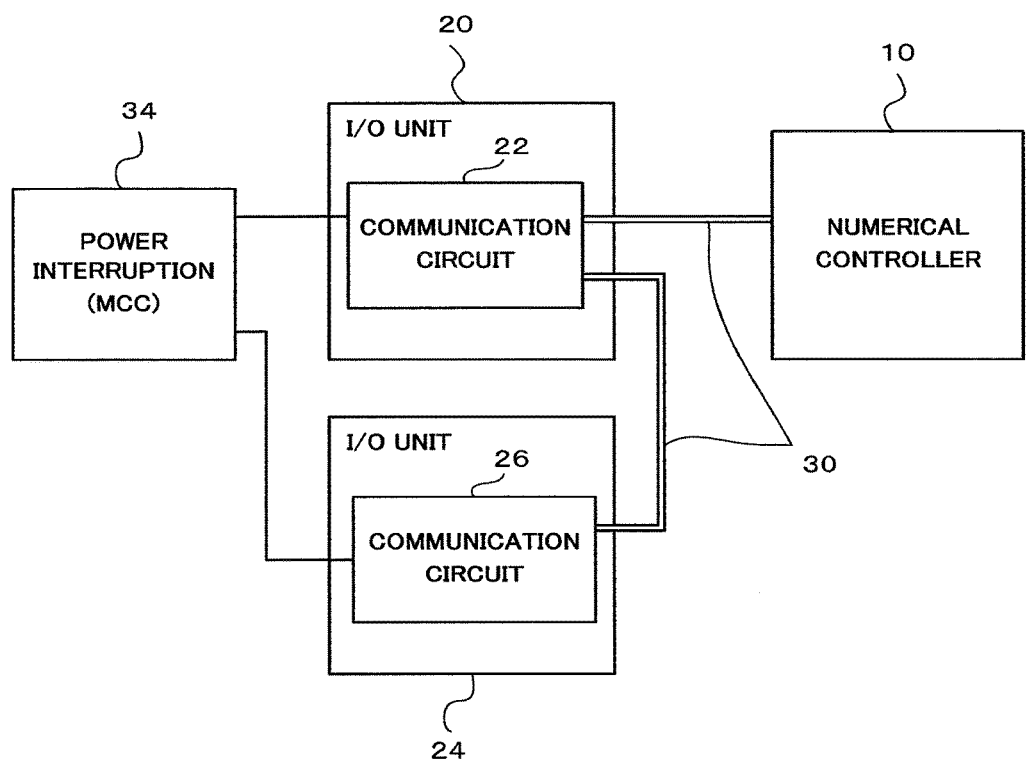
FIG. 6 is a diagram illustrating a case where output signals for power interruption and the like are made to comply with the safety standards.

In this embodiment, as shown in FIG. 1, each key switch 42 on the machine control panel 40 is provided with two contacts such that the machine control panel 40 can comprise the two independent communication circuits 44 and 46. Signals from the double-contact key switch 42 are received by the two independent communication circuits 44 and 46, and safety-related signals are transmitted from the communication circuits 44 and 46 to the numerical controller 10 through the first bus 48 and the second bus 30. The safety-related signals from the communication circuits 44 and 46 received by the numerical controller 10 are compared with each other so that they can be made to comply with the safety standards by monitoring the integrity of the safety function. Thus, in this embodiment, I/O units and switches, which are required in the prior art techniques (FIGS. 4 and 5), are not required and unnecessary. Since the key switches 42 on the machine control panel 40 are categorized into two systems, moreover, operability equivalent to that of a conventional machine control panel can be maintained.

Figure 2:
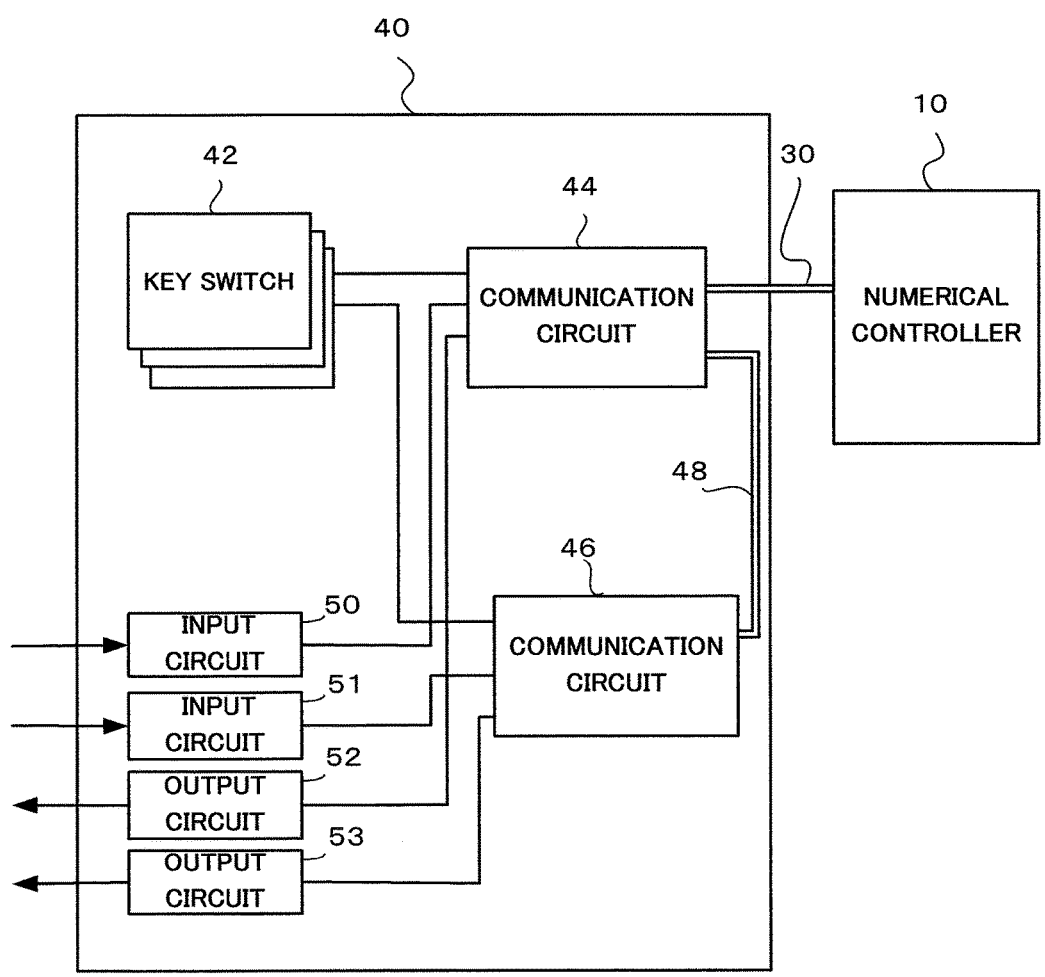
FIG. 2 is a diagram illustrating second and third embodiments of the machine control panel according to the present invention.
Figure 3:
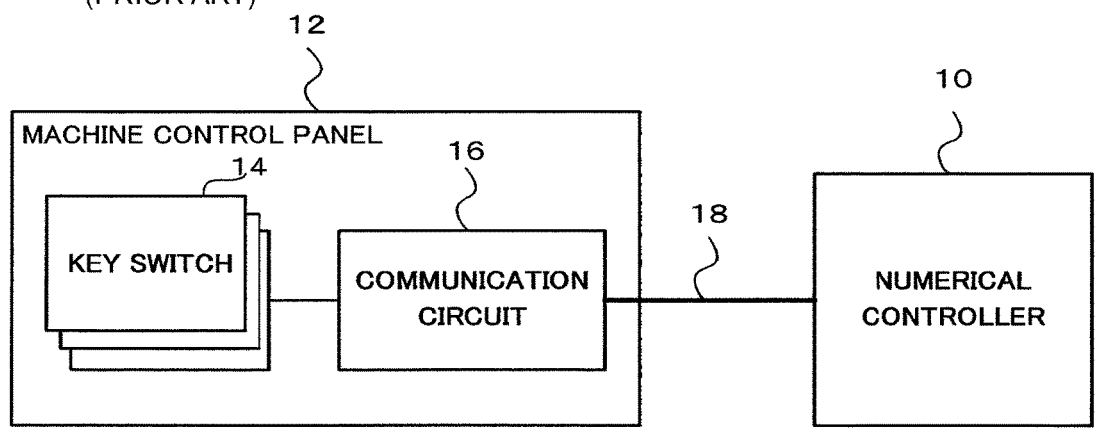
FIG. 3 is a diagram illustrating an example of a conventional machine control panel.

Second and third embodiments of the machine control panel according to the present invention will now be described with reference to FIG. 2.

A machine control panel 40 comprises input circuits 50 and 51 of two independent systems or output circuits 52 and 53 of two systems, which are connected to two independent communication circuits 44 and 46 so that external safety-related signals can be connected to the machine control panel 40.

The machine control panel 40 according to the second embodiment of the invention comprises the first and second input circuits 50 and 51 that can receive external signals of two systems. The first and second input circuits 50 and 51 are connected to the first and second communication circuits 44 and 46, respectively.

The machine control panel 40 according to the third embodiment of the invention comprises the first and second output circuits 52 and 53 that are connected to the first and second communication circuits 44 and 46, respectively. Signals received from the numerical controller 10 are output to the outside from the first and second output circuits 52 and 53 through the first and second communication circuits 44 and 46, respectively.

According to the embodiments of the present invention, (1) no spaces are required for I/O units and switches to be assembled for two systems of safety-related signals, so that space saving can be achieved, (2) I/O units or switches need not be additionally provided for two systems of safety-related signals, so that the safety standards can be complied with at lower cost than in the conventional method, and (3) the key switches on the machine control panel are categorized into two systems, so that the safety standards can be complied with while maintaining operability equivalent to that of a conventional machine control panel.

The invention claimed is:

1. A machine control panel connected to a numerical controller for controlling a machine tool and configured to operate the machine tool, comprising:
   a double-contact key switch provided on the machine control panel, the double-contact key switch having first and second contacts configured to be turned on when the double-contact key switch is depressed;
   a first communication circuit connected to the first contact and configured to receive a signal of the double-contact key switch when the double-contact key switch is depressed;
   a second communication circuit connected to the second contact, and configured to receive the signal of the double-contact key switch when the double-contact key switch is depressed;
   a first transmission line connecting the first and second communication circuits, and configured to transmit the signal of the second communication circuit to the first communication circuit;
   a second transmission line connecting the first communication circuit and the numerical controller, and configured to transmit the signals of the first and second communication circuits from the first communication circuit to the numerical controller;
   a first input circuit and a second input circuit other than the first and second communication circuits, and configured to receive external safety-related signals of two systems from an external device other than the numerical controller; and
   a first output circuit connected to the first communication circuit and a second output circuit connected to the second communication circuit, wherein
the first and second input circuits are connected to the first and second communication circuits, respectively, to communicate the received external safety-related signals of two systems to the numerical controller via the first and second communication circuits,
the numerical controller is configured to compare the signals received from the first and second communication circuits with each other in order to comply with safety standards by monitoring integrity of a safety function, and
the first and second communication circuits are configured to receive safety-related signals of two systems from the numerical controller and then output to the outside through the first and second output circuits, respectively.

2. A machine control panel connected to a numerical controller for controlling a machine tool and configured to operate the machine tool, comprising:
 a double-contact key switch provided on the machine control panel;
 first and second contacts contained within the key switch, and configured to be turned on when the key switch is depressed;
 a first communication circuit connected to the first contact and configured to receive a signal of the key switch;
 a second communication circuit connected to the second contact and configured to receive a signal of the key switch;
 a transmission line connecting the first and second communication circuits and configured to transmit the signal of the second communication circuit to the first communication circuit; and
 a transmission line configured to transmit the signals of the first and second communication circuits from the first communication circuit to the numerical controller,
wherein the transmission line connecting the first and second communication circuits is wiring on a printed circuit board in the machine control panel,
the transmission line from the first communication circuit to the numerical controller is a cable, and
the numerical controller is configured to compare the signals received from the first and second communication circuits with each other in order to comply with safety standards by monitoring integrity of a safety function.

* * * * *